United States Patent
Twork

(10) Patent No.: US 7,240,955 B2
(45) Date of Patent: Jul. 10, 2007

(54) METHODS AND APPARATUS FOR CONNECTING DOOR TRIM TO A DOOR MODULE

(75) Inventor: Michael Twork, While Lake, MI (US)

(73) Assignee: Faurecia Interior Systems, Auburn Hills, MI (US)

(*) Notice: Subject to any disclaimer, the term of this patent is extended or adjusted under 35 U.S.C. 154(b) by 141 days.

(21) Appl. No.: 11/132,671

(22) Filed: May 19, 2005

(65) Prior Publication Data
US 2006/0261632 A1   Nov. 23, 2006

(51) Int. Cl.
*B60J 7/00* (2006.01)
(52) U.S. Cl. .................... 296/146.7; 296/39.1
(58) Field of Classification Search ............. 296/146.7, 296/39.1; 49/502; 52/511
See application file for complete search history.

(56) References Cited

U.S. PATENT DOCUMENTS

| | | |
|---|---|---|
| 3,239,988 A | 3/1966 | Meyer |
| 5,111,619 A | 5/1992 | Billin et al. |
| 5,233,731 A | 8/1993 | Phillips |
| 5,529,370 A | 6/1996 | Veit |
| 6,123,385 A | 9/2000 | Bailey et al. |
| 6,381,906 B1 * | 5/2002 | Pacella et al. ................. 49/502 |
| 2002/0047289 A1 | 4/2002 | Furuyama et al. |

* cited by examiner

*Primary Examiner*—Joseph D. Pape
(74) *Attorney, Agent, or Firm*—Matthew B. Dernier; Kaplan Gilman Gibson & Dernier LLP

(57) ABSTRACT

An apparatus for locking a door trim panel to a door module includes: at least one hook depending from an inwardly directed surface of said door trim panel; an elongate locking element having a first end and a second end, the first end being connected to an end of the hook by way of a hinge; at least one receiver depending from an opposing surface of said door module and being operable to engage said hook, the receiver including an edge directed toward the opposing surface of the door module; and a cleat depending from the surface of the door trim panel and operable to engage the second end of the locking element when the locking element is a locking position, wherein the edge of the receiver engages the locking element and prevents the hook from disengaging from the receiver once the second end of the locking element engages the cleat.

14 Claims, 3 Drawing Sheets

US 7,240,955 B2

METHODS AND APPARATUS FOR CONNECTING DOOR TRIM TO A DOOR MODULE

BACKGROUND OF THE INVENTION

The present invention relates to methods and apparatus for securing a door trim panel to the door module of a vehicle.

Door trim panels are employed as interior components on automotive vehicles. One of the purposes of such interior trim panels is to present an aesthetically pleasing appearance. Door trim panels are typically mounted to structural support members on the door module. For example, door trim panels are mounted to an inner door sheet metal panel or to a door module which replaces the traditional inner door sheet metal of the automotive vehicle.

U.S. Pat. No. 6,123,385 discloses a trim panel mounting assembly in which a trim panel is connected to an interior of a motor vehicle by an engagement between a trim panel bracket and a support bracket. In particular, means is provided for allowing the trim panel bracket and the support bracket to self-align when they are brought into proximate position for installation. The two brackets are held together by insertion of a leg portion provided on the trim panel bracket into a clip provided on the support bracket. Notably, the door trim panel is attached to the door sheet metal by sliding the door trim panel downward with respect to the door sheet metal such that the trim panel bracket engages the support bracket.

U.S. Pat. No. 5,529,370 discloses a trim mounting assembly in which a trim panel is connected to an interior of a motor vehicle by engagement of a trim panel bracket and a support bracket. In particular, both the trim panel bracket and the support bracket are provided with a leg and a clip, and the two brackets are held together by insertion of the leg of the trim panel bracket into the clip of support bracket, as well as by insertion of the leg of the support bracket into the clip of the trim panel bracket. As with the '385 patent, the '370 patent teaches that the door trim panel is attached to the door sheet metal by sliding the door trim panel downward with respect to the door sheet metal such that the trim panel bracket engages the support bracket.

An example of a prior art approach to connecting a door trim panel to a door module is illustrated in FIGS. 1A-B. The simplified diagrams illustrated in FIGS. 1A-B include a door module 12 and door trim panel 14. A hook 16 is coupled to the door trim panel 14 and is downwardly directed and oriented such that is may engage a receiver 18 coupled to the door module 12. As shown in FIG. 1B, when the door trim panel 14 is moved in the downward direction shown by the arrow, the hook 16 engages the receiver 18 and prevents the door trim panel 14 from laterally separating from the door module 12.

While they are not usually employed as structural components, there are times when door trim panels must support a load. A load may be placed on the door trim panel during opening or closing thereof via activation of a door pull handle. Door pull handles are typically mounted to the door trim panels and are employed to pull the door shut once the occupant has entered the vehicle. The door pull handles may also be used as a support for the occupant as he/she enters the vehicle, such as during the egress/ingress of a truck or van where the occupant compartment is disposed relatively above the waist of the occupant. Depending on the reliance of the occupant on the support of the door pull handle, as well as the occupant's weight and manner of pulling the door shut, it is possible that substantial loads can be generated at the pull handle on the trim panel. These loads tend to urge the door trim panel upward with respect to the door module and if left unchecked lead to disengagement of the trim and support brackets.

In the aforementioned patents and prior art techniques, the conventional approach to prevent the door trim panel from sliding back up (and disengaging the support bracket) under loading conditions is to employ screws that hold the door pull handle to the trim and the door module.

Unfortunately, the use of screws with the door pull handles increases manufacturing costs. In addition, use of such screws detracts from the aesthetic appearance of the interior of the vehicle. In many cases, use of screws apart from the door pull handle are problematic because appearance requirements generally prohibit the use of exposed fasteners which might otherwise be used to strengthened the connection of the door trim panel to the door module.

Thus, there are needs in the art for a new approach to securing a door trim panel to a door module which does not require the conventional use of screws to prevent the door trim panel from sliding up with respect to the door module.

SUMMARY OF THE INVENTION

In accordance with one or more aspects of the present invention, an apparatus for locking a door trim panel to a door module includes: at least one hook depending from an inwardly directed surface of said door trim panel, the hook including an elongate locking element having a first end pivotally connected thereto and a second end; at least one receiver depending from an opposing surface of said door module and being operable to engage said hook; and an actuating member located below the receiver and being operable to pivot said locking element to a locking position when said hook is engaged with said receiver.

The hook may include a proximal end and a distal end and the locking element may be coupled to the distal end by way of a hinge. Preferably, the hinge is a living hinge. The actuating member preferably includes a curved or slanted surface operable to move the second end of the locking element and rotate same about the hinge as the hook is moved toward the receiver. Preferably, the curved or slanted surface terminates at an edge facing the surface of the door trim panel, and the edge is positioned below the receiver such that it rotationally urges the locking element into the locked position as the hook moves into the receiver. The receiver may include an edge directed toward the opposing surface of the door module, and the edge of the receiver preferably rotationally urges the locking element opposite to that of the edge of the actuating member.

Preferably, the hinge is located above the edge of the receiver and the edge of the receiver is above the edge of the actuating member when the locking element is in the locked position. Further, the hinge is preferably laterally offset from the edge of the receiver and the edge of the receiver is laterally offset from the edge of the actuating member when the locking element is in the locked position.

The apparatus preferably further includes: a cleat depending from the surface of the door trim panel and operable to engage the second end of the locking element when the locking element is in the locking position; and an edge on the receiver directed toward the opposing surface of the door module such that it prevents the hook from disengaging from the receiver once the second end of the locking element engages the cleat. The cleat may be sized and shaped such that it hinders rotational movement of the locking element toward the surface of the door module when the locking element is in the locked position. Alternatively or in addition, the cleat is sized and shaped such that it urges the second end of the locking element against the surface of the door trim panel when the locking element is in the locked position.

The hinges location above and laterally offset from the edge of the receiver when the locking element is in the locked position preferably results in the edge of the receiver urging the second end of the locking element against the cleat in response to urging of the hook out of the receiver. The actuating member includes an edge below the receiver and facing the surface of the door trim panel such that it rotationally urges the locking element toward the surface of the door trim panel as the hook is urged into the receiver.

In accordance with one or more further embodiments of the present invention, an apparatus for locking a door trim panel to a door module includes: at least one hook depending from an inwardly directed surface of said door trim panel; an elongate locking element having a first end and a second end, the first end being connected to an end of the hook by way of a hinge; at least one receiver depending from an opposing surface of said door module and being operable to engage said hook, the receiver including an edge directed toward the opposing surface of the door module; and a cleat depending from the surface of the door trim panel and operable to engage the second end of the locking element when the locking element is a locking position. The edge of the receiver engages the locking element and prevents the hook from disengaging from the receiver once the second end of the locking element engages the cleat.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

Figure 1B:
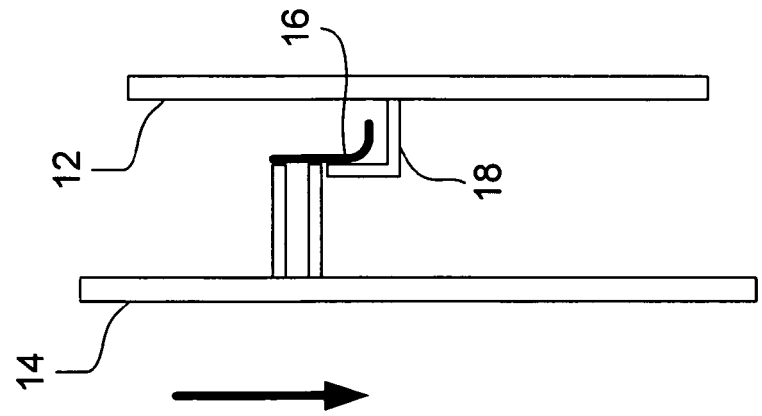
FIGS. 1A and 1B are schematic diagrams of a conventional door trim hook and receiver arrangement in accordance with the prior art.
Figure 1A:
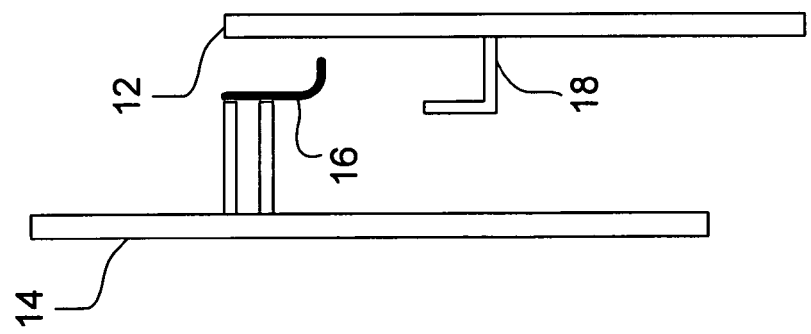
Figure 2:
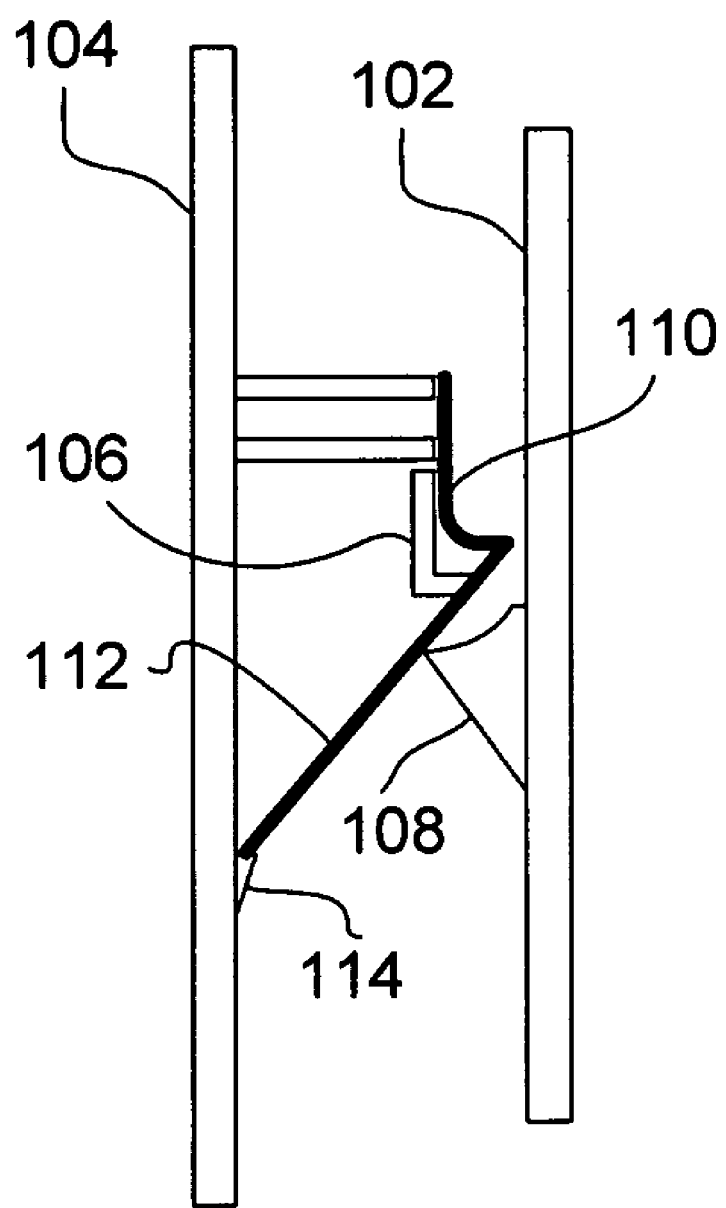
FIG. 2 is a side schematic view of a hook and receiver apparatus for connecting a door trim panel to a door module in accordance with one or more embodiments of the present invention.

With reference to the drawings, wherein like numerals indicate like elements, there is shown in FIG. 2 a side schematic view of an apparatus for connecting a door trim panel 104 to a door module 102 in accordance with one or more embodiments of the present invention. The door module 102 preferably represents one or more structural elements of the door of a vehicle and the door trim panel 104 represents an aesthetically pleasing panel that covers the less aesthetically pleasing components of the door module 102. The door trim panel 104 is preferably coupled to the door module 102 by way of one or more locking mechanisms, one such mechanism being shown for brevity and clarity. In a preferred embodiment, numerous locking mechanisms would be utilized in different locations to ensure that the door trim panel 104 is securely attached to the door module 102.

In accordance with preferred embodiments of the invention, the locking mechanism includes a receiver 106, a hook 110, and a locking element 112. Unlike the conventional approaches of the prior art, the locking element 112 is operable to prevent the door trim panel 104 from sliding upward (as viewed in FIG. 2) with respect to the door module 102 once the locking element 112 has achieved a locking position.

Figure 3C:
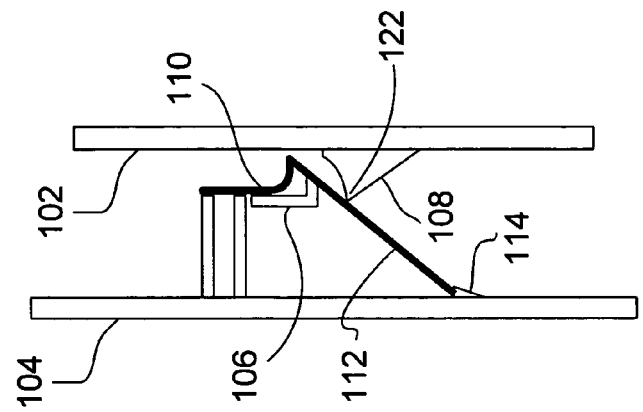
FIGS. 3A, 3B, and 3C are side schematic views of the hook and receiver apparatus of FIG. 2 in various stages of assembly.
Figure 3B:
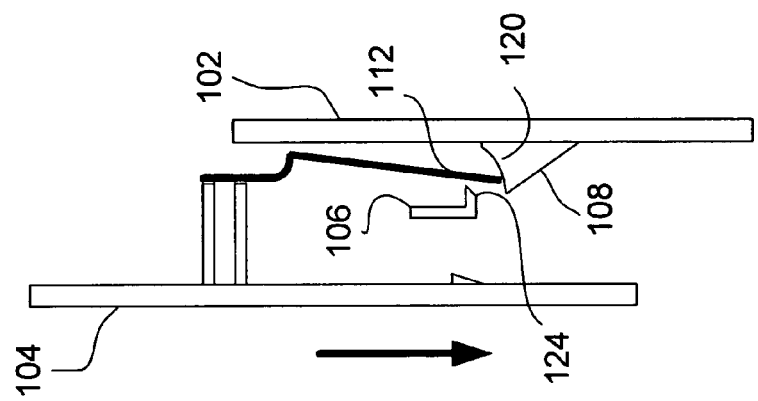
Figure 3A:
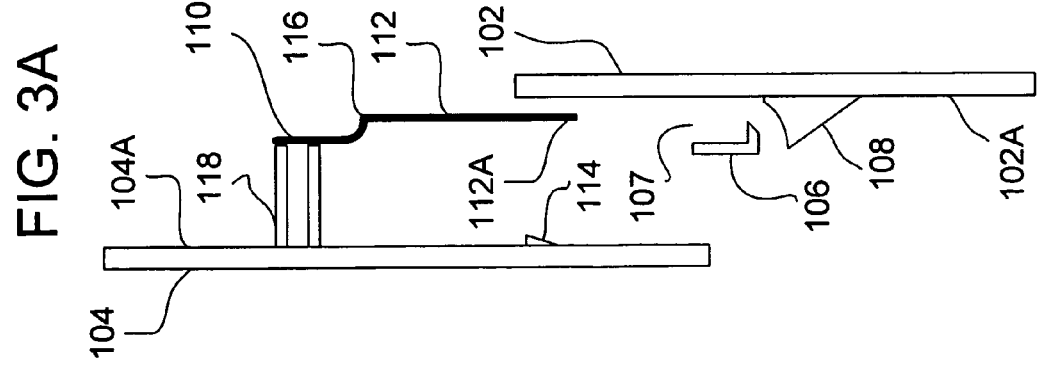

Reference is now made to FIGS. 3A-C, which illustrate side schematic views of the door module 102 and door trim panel 104 of FIG. 2 in various stages of assembly. The door trim panel 104 includes an inwardly directed surface 104A that faces an oppositely directed surface 102A of the door module 102. The hook 110 is coupled to the inwardly directed surface 104A by way of coupling means 118. Those skilled in the art will appreciate that any appropriate bracketing techniques may be employed in implementing the coupling means 118. The hook 110 includes a proximal end that is connected to the coupling means 118 and a distal end. The hook 110 preferably includes a longitudinal directed member followed by a curvate portion terminating at the distal end thereof.

The locking element 112 includes a first end pivotally connected to the distal end of the hook 110. The locking element 112 is preferably an elongate body, which may take on any suitable shape that will be apparent to those skilled in the art in view of the description herein. For example, the locking element 112 may be of a generally rectangular configuration, such as a parallelepiped. In a preferred embodiment, the first end of the locking element 112 is coupled to the distal end of the hook 116 by way of a hinge. Preferably, the hinge is a living hinge. In this regard, the hook 110 and the locking element 112 are preferably formed from one or more suitable plastic materials, such as polypropylene, polyethylene, or the like. For example, a living hinge may be formed by way of a relatively thin section of plastic that connects the hook 110 and the locking element 112. Irrespective of how the hinge 116 is implemented, the hinge 116 preferably permits the second end 112A to rotate about the hinge 116 as illustrated in FIGS. 3B and 3C.

The receiver 106 is preferably coupled to the surface 102A of the door module 102 utilizing appropriate coupling means. It is contemplated that any of the known coupling techniques may be employed to insure that the receiver 106 is properly secured to the door module 102. In a preferred embodiment, the receiver 106 may take on the form of a loop when viewed in a downward direction (noting that FIGS. 3A-C are side views). The receiver 106 and the door module 102 (for example the surface 102A thereof) define an opening 107 into which the locking element 112 and the hook 110 may enter.

The locking mechanism also includes an actuating member 108 that is coupled to the door module 102, preferably the surface 102A thereof. The actuating member 108 is preferably located below the receiver 106 and is operable to pivot the locking element 112 as the second end 112A moves through the opening 107 in route to the locking position (which is shown in FIG. 3C). As best seen in FIG. 3B, the actuating member 108 preferably includes a curved or slanted surface 120 that is operable to move the second end 112A of the locking element 112 and rotate same about the hinge 116 as the hook 110 is moved toward the receiver 106. Those skilled in the art will appreciate that the particular contour of the curved surface 120 may be adjusted depending on the specific dimensions of, for example, the hook 110, the locking element 112, the receiver 106, etc. The curved surface 120 preferably terminates at an edge 122 of the actuating element 108, which edge 122 faces the inwardly directed surface 104A of the door trim panel 104. The edge 122 is preferably positioned below the receiver 106 or at least below the opening 107 such that the edge 122 urges the locking element 112 toward the locked position as the hook 110 moves into the receiver 106.

As best seen in FIGS. 3A and 3C, the locking mechanism also preferably includes a cleat 114 depending from the surface 104A of the door trim panel 104. The cleat 114 is preferably operable to engage the second end 112A of the locking element 112 when the locking element 112 is in the locking position (FIG. 3C). The cleat 114 is preferably sized and shaped such that it hinders rotational movement of the locking element 112 toward the surface 102A of the door module 102 when the locking element 112 is in the locked position. More particularly, the cleat 114 is preferably sized and shaped such that it urges the second end 112A of the locking element 112 against the surface 104A of the door trim panel 104 when the locking element 112 is in the locked position. Those skilled in the art will appreciate that any number of configurations may be employed to implement the cleat 114, such as the ledge arrangement illustrated.

The receiver 106 preferably includes an edge 124 directed toward the opposing surface 102A of the door module 102 such that it prevents the hook 110 from disengaging from the receiver 106 once the second end 112A of the locking element 112 engages the cleat 114. The edge 124 is preferably chamfered such that it permits the locking element 112 to rotate to a sufficient degree to clear the edge 122 of the actuating member 108 and also permits the locking element 112 to slide somewhat such that the second end 112A of the locking element 112 engages the cleat 114. Once the locking element 112 is in the locking position, the edge 124 of the receiver 106 rotationally urges the locking element in an opposing fashion as compared with the edge 122 of the actuating member 108. The engagement of the edge 124 of the receiver 106 urges the hook 110 into engagement with the receiver 106 and the cleat 114 opposes any rotational tendency of the locking element 112 about the hinge 116. This results from the relative positions of the hinge 116 and the edges 122, 124. In particular, the hinge 116 is located above the edge 124 of the receiver 106 and the edge 124 is located above the edge 122 of the actuating member 108. Further, the hinge 116 is laterally offset from the edge 124 of the receiver 106 and the edge 124 is also laterally offset from the edge 122 of the actuating member 108. This configuration insures that the door trim panel 104 cannot move upwardly with respect to the door module once the locking element 112 is in the locking position.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus for locking a door trim panel to a door module, comprising:

at least one hook depending from an inwardly directed surface of the door trim panel, the hook including an elongate locking element having a first end pivotally connected thereto and a second end;

at least one receiver depending from an opposing surface of the door module and being operable to engage the hook; and an actuating member located below the receiver and being operable to pivot the locking element to a locking position when the hook is engaged with the receiver.

2. The apparatus of claim 1, wherein the hook includes a proximal end and a distal end and the locking element is coupled to the distal end by way of a hinge.

3. The apparatus of claim 2, wherein the hinge is a living hinge.

4. The apparatus of claim 2, wherein the actuating member includes a curved or slanted surface operable to move the second end of the locking element and rotate same about the hinge as the hook is moved toward the receiver.

5. The apparatus of claim 4, wherein:

the curved surface terminates at an edge facing the surface of the door trim panel; and the edge is positioned below the receiver such that it rotationally urges the locking element into the locked position as the hook moves into the receiver.

6. The apparatus of claim 5, wherein:

the receiver includes an edge directed toward the opposing surface of the door module; and the edge of the receiver rotationally urges the locking element opposite to that of the edge of the actuating member.

7. The apparatus of claim 6, wherein the hinge is located above the edge of the receiver and the edge of the receiver is above the edge of the actuating member when the locking element is in the locked position.

8. The apparatus of claim 7, wherein the hinge is laterally offset from the edge of the receiver and the edge of the receiver is laterally offset from the edge of the actuating member when the locking element is in the locked position.

9. The apparatus of claim 1, further comprising:

a cleat depending from the surface of the door trim panel and operable to engage the second end of the locking element when the locking element is in the locking position; and an edge on the receiver directed toward the opposing surface of the door module such that the edge prevents the hook from disengaging from the receiver once the second end of the locking element engages the cleat.

10. The apparatus of claim 9, wherein the cleat is sized and shaped such that the cleat hinders rotational movement of the locking element toward the surface of the door module when the locking element is in the locked position.

11. The apparatus of claim 10, wherein the cleat is sized and shaped such that the cleat urges the second end of the locking element against the surface of the door trim panel when the locking element is in the locked position.

12. The apparatus of claim 9, wherein a position at which the first end is pivotally connected to the elongate locking element is located above and laterally offset from the edge of the receiver when the locking element is in the locked position, such that the edge of the receiver urges the second end of the locking element against the cleat in response to urging of the hook out of the receiver.

13. The apparatus of claim 11, wherein the actuating member includes an edge below the receiver and facing the surface of the door trim panel such that it rotationally urges the locking element toward the surface of the door trim panel as the hook is urged into the receiver.

14. An apparatus for locking a door trim panel to a door module, comprising:
- at least one hook depending at a first end from an inwardly directed surface of said door trim panel, and having a second end;
- an elongate locking element having a first end and a second end, the first end being connected to the second end of the hook by way of a hinge;
- at least one receiver depending from an opposing surface of said door module and being operable to engage said hook, the receiver including an edge directed toward the opposing surface of the door module; and
- a cleat depending from the surface of the door trim panel and operable to engage the second end of the locking element when the locking element is in a locking position,
- wherein the edge of the receiver engages the locking element and prevents the hook from disengaging from the receiver once the second end of the locking element engages the cleat.

* * * * *